United States Patent [19]

Winton

[11] 4,194,711

[45] Mar. 25, 1980

[54] FLEXIBLE SEWER LINE SUPPORT

[76] Inventor: Leroy Winton, P.O. Box 889, Placerville, Calif. 95667

[21] Appl. No.: 867,890

[22] Filed: Jan. 9, 1978

[51] Int. Cl.² .............................................. F16L 3/00
[52] U.S. Cl. .................................... 248/49; 248/83
[58] Field of Search ................. 248/49, 75, 80, 83, 248/85, 222.2, 224.4, 171, 166, 291, 70; 138/106, 110; 137/344; 405/120, 121

[56] References Cited

U.S. PATENT DOCUMENTS

| | | | |
|---|---|---|---|
| 554,516 | 2/1896 | Huhle | 248/166 |
| 2,528,358 | 10/1950 | Grass | 248/222.2 X |
| 3,120,937 | 2/1964 | Gutner | 248/291 X |
| 3,199,683 | 8/1965 | Graswich | 248/222.2 X |
| 3,288,406 | 11/1966 | Degen | 248/49 |
| 3,554,474 | 1/1971 | Davies | 248/49 |
| 3,611,731 | 10/1971 | Edmondson | 61/15 X |
| 3,623,500 | 11/1971 | Hoy | 137/344 |
| 3,809,348 | 5/1974 | Di Laura | 248/87 X |
| 3,811,462 | 5/1974 | Feliz | 137/344 |
| 3,882,886 | 5/1975 | Ely et al. | 137/344 |
| 4,125,237 | 11/1978 | Hagins | 248/49 |

Primary Examiner—Rodney H. Bonck
Attorney, Agent, or Firm—Blair, Brown & Kreten

[57] ABSTRACT

Disclosed herein is a flexible support structure suitably fashioned to accommodate external sewer lines and water lines that are commonly used in mobile homes, campers and trailers and the like. A series of inter-connected troughs are provided with means for fastening the lengths together and are additionally provided with structure which allows stands to support the troughs.

4 Claims, 11 Drawing Figures

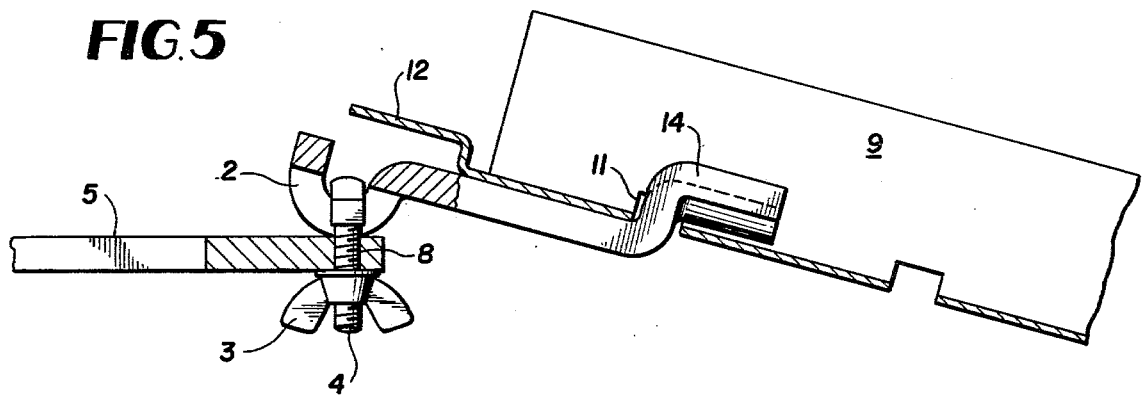
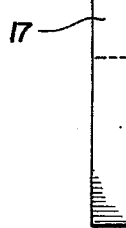
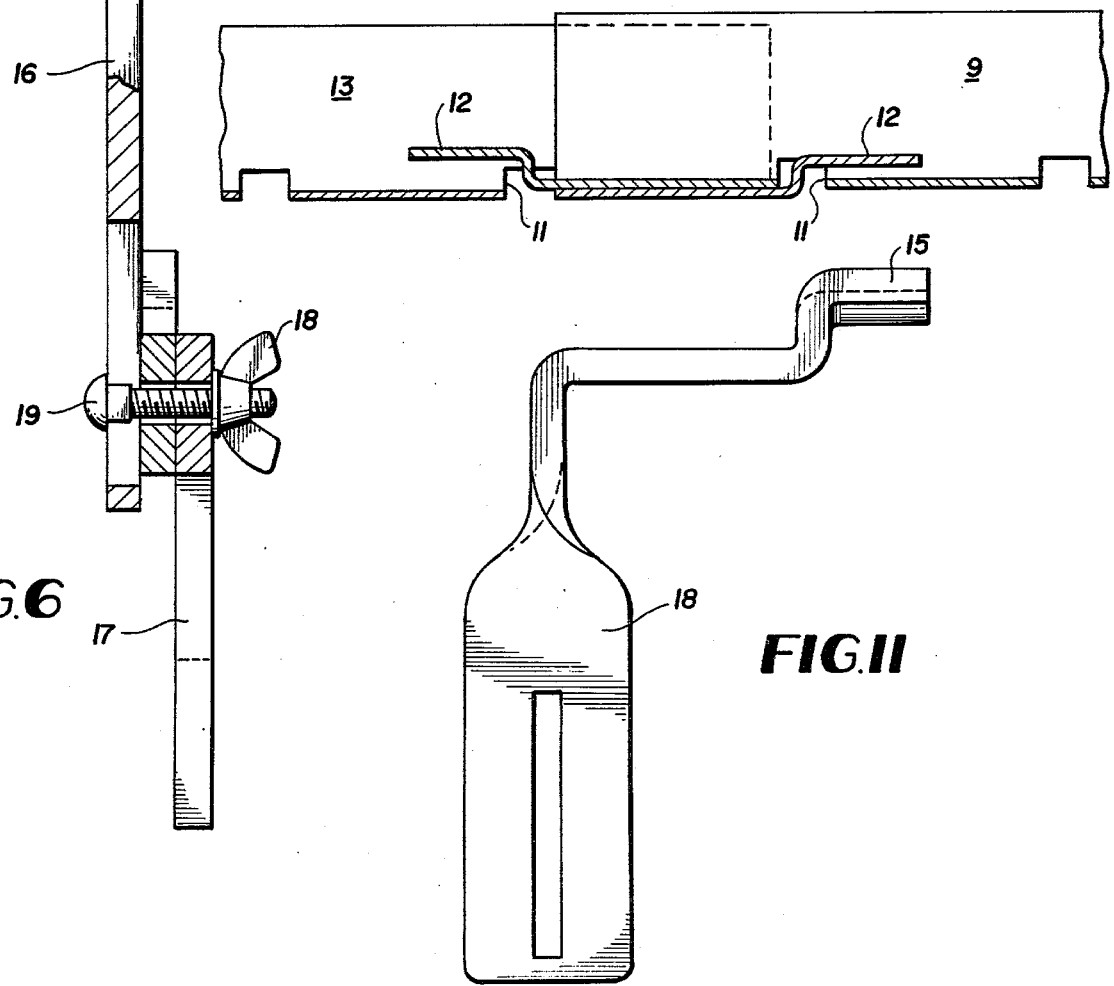

FLEXIBLE SEWER LINE SUPPORT

BACKGROUND OF THE INVENTION

Field of the Invention

With the increase of mobile type homes and in their associated environments, it has become apparent that the chemically treated sewer type reservoir located on many campers have many short comings, the most obvious of which would be the necessity to manually empty them. This of course can be eliminated by coupling a conduit in such a chamber but the problems associated with this type of arrangement include the lack of a device which would support the conduit yet still be of highly flexible design to accommodate different types of terrain and account for the likelihood of shifting camp sites which would therefore necessitate flexibility and adaptability of the basic design. Accordingly, this inventor is aware of patents to various people namely U.S. Pat. Nos. 3,623,500, 3,811,462 and 3,882,886, but none of these appear to address themselves to the problems that are the topic of this invention. The first listed patent for example fails to disclose the provision of a multiplicity of varying shaped support members interconnected to provide the flexible sewer line support as will be disclosed hereinafter and the remaining references fall further a field from the essence of this invention.

OBJECT OF THE INVENTION

Accordingly it is an object of this invention to provide a support system that is flexible and is perhaps most beneficially used in supporting a sewer line.

Another object of this invention contemplates providing a flexible support which can be adjusted to accommodate various types of terrain.

Another object of this invention contemplates providing a support structure which can be easily disassembled.

These and other objects will be made manifest when considering the following detailed specification and drawing figures.

BRIEF DESCRIPTION OF THE DRAWINGS

FIG. 5 is a sectional view taken along lines 5—5 of FIG. 1;

FIG. 6 is a sectional view taken along lines 6—6 of FIG. 1;

FIG. 7 is a sectional view taken along lines 7—7 of FIG. 1;

FIG. 11 is an embodiment of a support structure shown in FIG. 6.

DESCRIPTION OF THE PREFERRED EMBODIMENT

Figure 1:
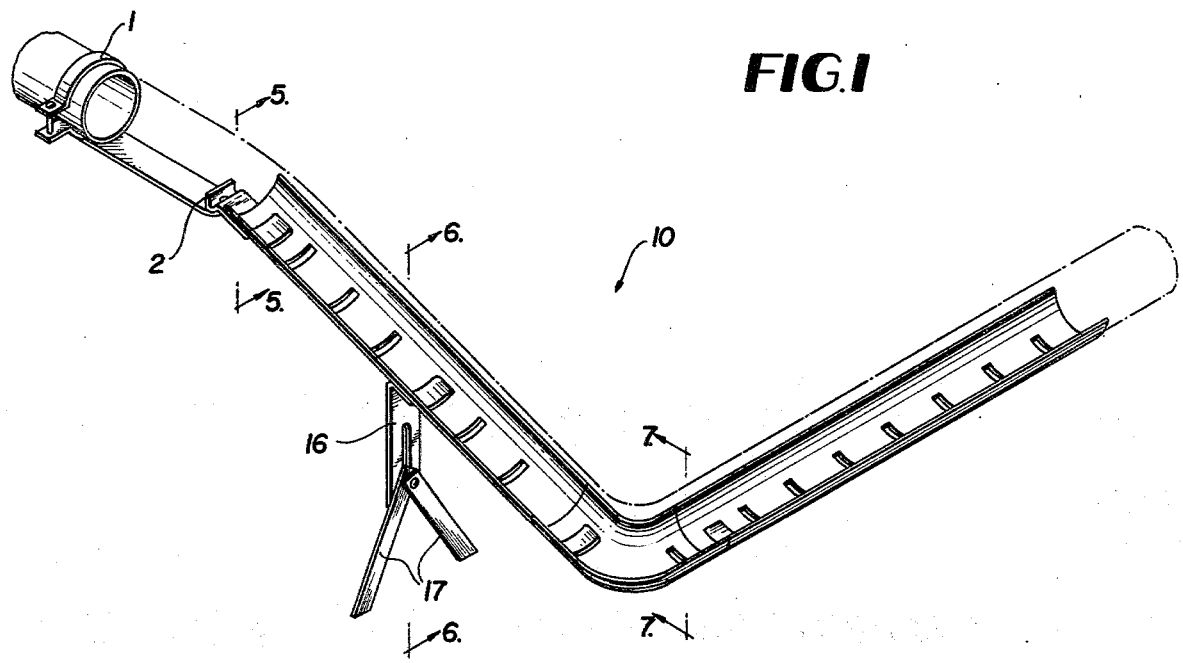
FIG. 1 is a perspective view of the apparatus according to the invention.
Figure 2:
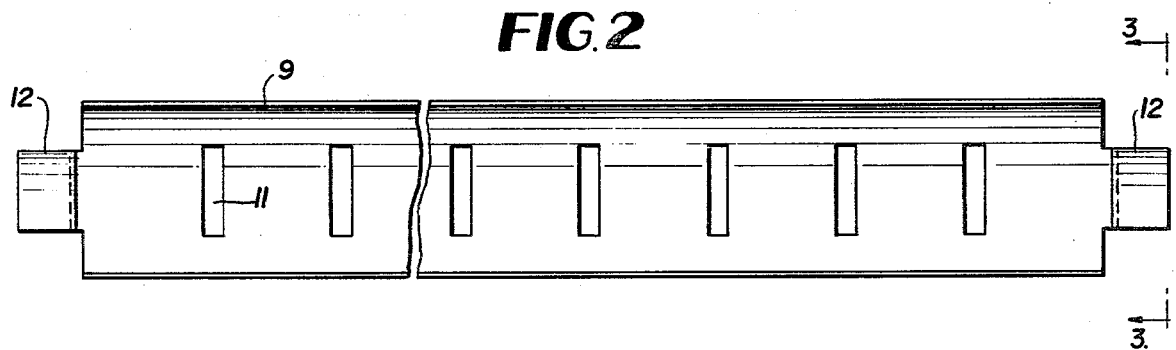
FIG. 2 is a top plan view of one linear element in the pipe support structure.
Figure 3:
FIG. 3 is a sectional view taken along the lines 3—3 of FIG. 2.

Referring to the drawings now wherein like reference numerals refer to like part throughout, reference numeral 10 generally denotes the flexible sewer line support structure.

Figure 4:
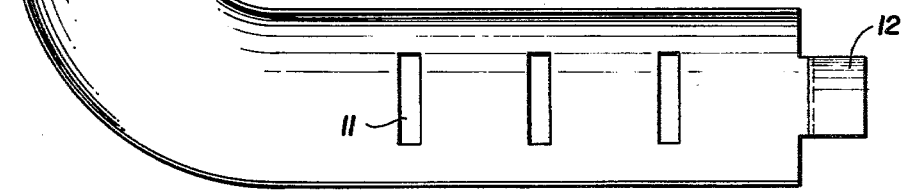
FIG. 4 is a top plan view of an elbow connector of one of the support structures.
Figure 8:
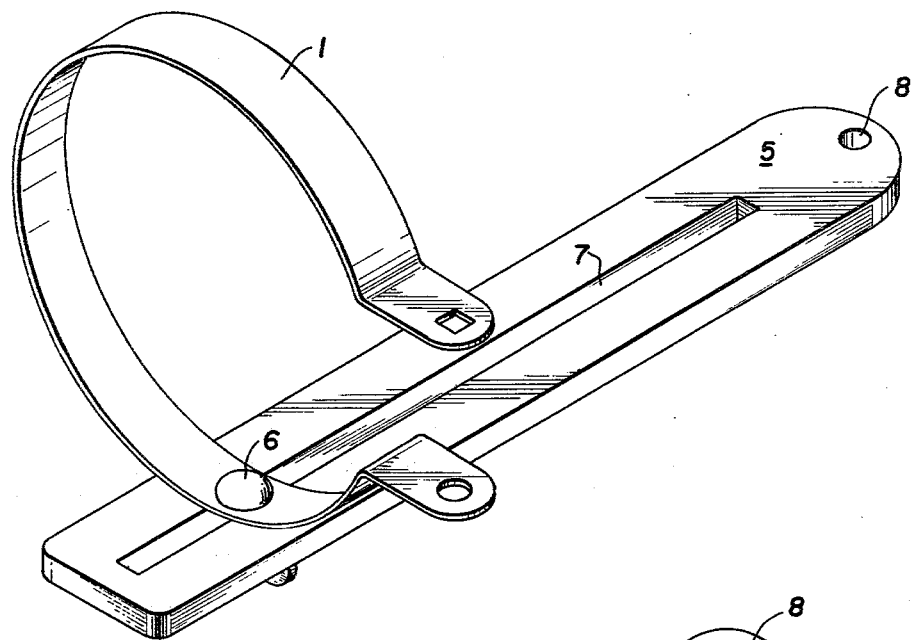
FIG. 8 depicts a portion of the left hand side of the perspective shown in FIG. 1.
Figure 9:
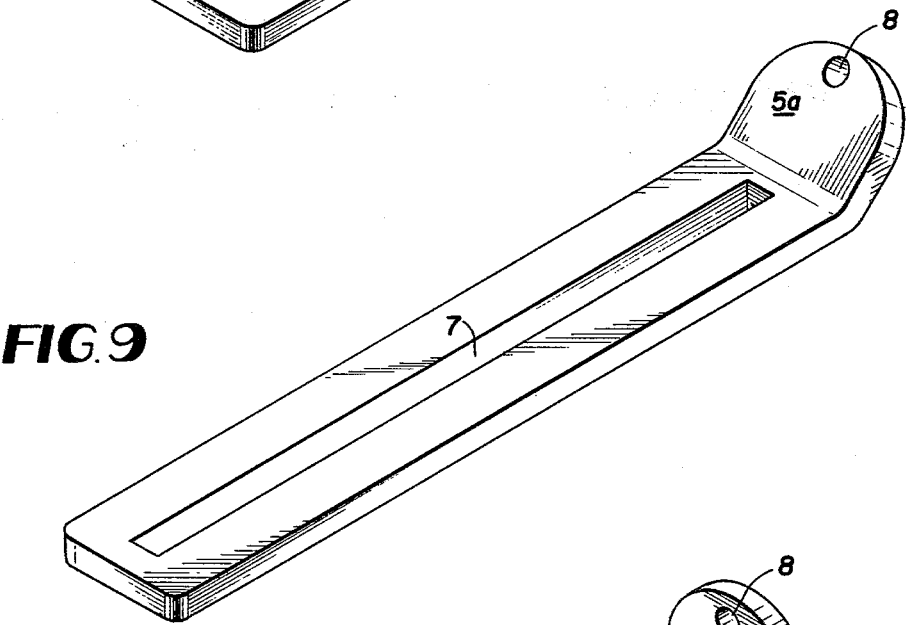
FIG. 9 is a modification of a portion of FIG. 8.
Figure 10:
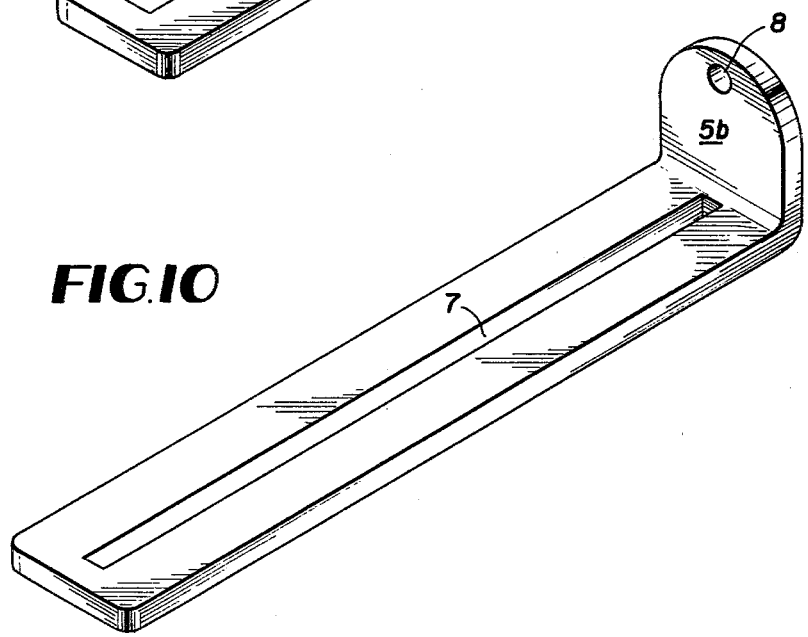
FIG. 10 is a further modification of the support shown in FIGS. 8 and 9.

This structure may generally be regarded as being formed of a plurality of half cylinders 9 having tabs at their extremities 12 and slots along their medial portions 11 to facilitate and allow inter-connection of a plurality of these cylinders. In the case where a change of direction is required, the embodiment of FIG. 4 perhaps would be of greatest value since it indicates a trough 13 having a 90 degree orientation in direction. The left hand side of FIG. 1 and an additional view of FIGS. 8, 9 and 10 show a conventional clamping structure 1 which is slidably disposed in a trackway 7 of bar element 5 and the positioning of this collar 1 in the trackway 7 on the bar 5 is controlled by stove bolt 6 having a wing nut disposed therebelow. Alternative embodiments of bar 5 are shown in FIGS. 9 and 10 as 5A and 5B in which the tongue element remote from the clamp 1 has an up turned portion of different degrees of rake, for example FIG. 9 shows the up turned tongue portion of approximately 45 degrees and FIG. 10 shows an up turned portion of approximately 90 degrees and it is important to know that this extremity is provided with a hole 8. Its purpose will be explained hereinafter.

Referring to FIG. 5 now the purpose of the hole 8 will now be apparent since bolt member 4 which has a flat head portion is caused to go through this hole 8 and is constrained from motion by wing nut 3. This screw member 4 fastens a connecting link which constrains the trough 9 from motion relative to the tongue or bar link 5. The means for connecting these two can be regarded as connecting link 2 which at one extremity is generally U-shaped and terminates in its other extremity in a generally S-shaped configuration as shown at 14. This portion 14 which extends within the trough 9 through orifice 11 provides the connection between the tongue and bracket 5 and collar 1 with the ensuring trough array.

As shown in FIG. 1, there is an additional support member denoted by reference numerals 16 and 17 and these perhaps are best seen in the view of FIG. 6. The legs 17 are adjustable in not only height but angularity relative to each other by means of wing nut 18 and bolt 19 and they also provide a source of connection to the slot disposed with link member 16. Link 16 has a vertical portion and the end remote from the wing nut terminates in a horizontal portion tangent to the trough member and this horizontal portion terminates in a generally S-shaped portion which extends within the orifice 11 of trough 9. An alternative embodiment can be seen in FIG. 11 which is substantially the same as that shown in FIG. 6 with a noteable distinction that element 16 has a twist to it so that the legs would be mounted in a plane 90 degrees from the one invisioned in FIGS. 1 and 6.

FIG. 7 shows a sectional view of the means for connecting two continuous trough sections in this case element 9 with right angle elements 13. It is to be noted that the tongues 12 are interleaved in the orifices 11 and that there is an overlapping portion where the two trough sections are coincident.

Having thus described the invention it will be apparent that numerous structural modifications are possible and are contemplated as being part of this invention as set forth above and as defined in the claims.

What is claimed is:

1. A flexible sewer conduit support comprising, in combination: a plurality of interconnected substantially semi-cylindrical troughs disposed in abutting relationship, said troughs having plural slots disposed on their bottom cylindrical faces, said troughs interconnected by means of tongue members disposed on said bottom face of said trough at each terminal portion of the longitudinal extent of said troughs, whereby said tongues of each trough extends into the slots of abutting troughs thereby defining a continuous, underlying interleaved support and means to support said trough and incline the trough above ground level in which said means to support said trough above the ground include a bracket member having a generally S-shaped upper portion to engage a slot in said trough, said portion terminates in a vertically downwardly extending lower portion said lower portion having a slot disposed therein, and said slot being provided with a bolt which serves to fasten a plurality of legs thereon.

2. The device of claim 1 in which said conduit is constrained on a bar member by means of a collar slidably disposed on said bar member, said bar member having a terminal portion provided with an orifice which is fastened by means of a bolt to an additional bracket member inter-connected with a slot in the trough.

3. The device of claim 2 in which said additional bracket member has one terminal portion of substantially U-shaped configuration for connection with the orifice of the bar member and another extremity of generally S-shaped configuration for connection with the trough slot.

4. The device of claim 3 in which one of said troughs has a 90° elbow bend.

* * * * *